United States Patent Office 3,424,768
Patented Jan. 28, 1969

3,424,768
17α-ALKYNYLESTRA-4,9(10)-DIENE-3β,17β-DIOLS AND ESTERS THEREOF
Paul D. Klimstra, Northbrook, Ill., assignor to G. D. Searle & Co., Chicago, Ill., a corporation of Delaware
No Drawing. Filed Aug. 17, 1965, Ser. No. 480,488
U.S. Cl. 260—397.5                                        9 Claims
Int. Cl. A61k 17/06; C07c 169/08

ABSTRACT OF THE DISCLOSURE 17-alkynylestra-4,9(10)-diene-3β,17β-diols and esters thereof useful in view of their pharmacological activity, i.e. androgenic, estrogenic, anti-fertility and anti-inflammatory, and preparable from the corresponding 3,17-diones by selective formation of the 17-cyanahydrin, acylation of the latter moiety, reduction of the 3-keto group, removal of the acylated cyanohydrin function and alkynylation of the 17-keto group thus liberated. The diols so produced are acylated to form the corresponding esters and can alternatively be manufactured by reduction of the corresponding 3-keto substances.

---

The present invention is concerned with novel nuclearly unsaturated steroidal compounds carrying oxygenated functions at the 3 and 17 positions and, more particularly, with 17α - alkynylestra-4,9(10)-diene-3β,17β-diols and esters thereof, as represented by the structural formula

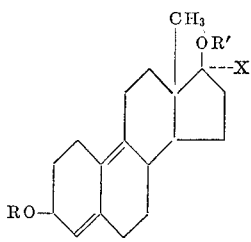

wherein R and R' can be hydrogen or a lower alkanoyl radical and X is a lower alkynyl radical.

Examples of the lower alkanoyl radicals encompassed by the foregoing structural representation are formyl, acetyl, propionyl, butyryl, valeryl, caproyl, heptanoyl and the branched-chain groups isomeric therewith.

The lower alkynyl radicals depicted therein are typified by ethynyl, propynyl, butynyl, pentynyl, hexnyl, heptynyl and the branched-chain isomers thereof.

The compounds of this invention are conveniently manufactured by utilizing as the starting material estra-4,9(10)-diene-3,17-dione. The latter substance is thus contacted with acetone cyanohydrin in the presence of triethylamine to produce 17-cyano-17-hydroxyestra-4,9(10)-dien-3-one. Acetylation of the latter cyanohydrin with acetic anhydride in pyridine results in 17-acetoxy-17-cyanoestra-4,9(10)-dien-3-one, which is reduced with lithium tri-(tertiary-butoxy) aluminum hydride, thus producing 17-acetoxy-17-cyanoestra-4,9(10)-dien-3β-ol. Reaction of that compound with aqueous sodium carbonate in methanol affords 3β-hydroxyestra-4,9(10)-dien-17-one. That substance is allowed to react with acetylene in the presence of potassium tertiary-butoxide to yield the instant 17α-ethynylestra-4,9(10)-diene-3β,17β-diol.

An alternate method for manufacture of the instant 3-hydroxy compounds involves reaction of the corresponding 3-keto compounds with a suitable reducing agent. The reduction of 17α-ethynyl-17β-hydroxyestra-4,9(10)-dien-3-one with lithium tri-(tertiary-butoxy) aluminum hydride in tetrahydrofuran thus results in 17α-ethynylestra-4,9(10)-diene-3β,17β-diol.

When the instant 17-alkynyl-3,17β-diols are contacted with a lower alkanoic acid anhydride or halide, preferably in the presence of a suitable acid acceptor, the 3-mono-(lower alkanoates) are produced. As a specific example, the aforementioned 17α - ethynylestra-4,9(10)-diene-3β,17β-diol is contacted with acetic anhydride in pyridine at room temperature to yield the corresponding 3-monoacetate.

A procedure especially adapted for manufacture of the 17-mono-(lower alkanoates) and the 3,17-bis-(lower alkanoates) of this invention utilizes 17α-(lower alkynyl)-17β-(lower alkanoyl)oxyestr-5(10)-en-3-ones as starting materials. The reaction of those substances with bromine in the presence of a suitable organic base results in the corresponding Δ⁴,⁹⁽¹⁰⁾ compounds which can be reduced by processes analogous to those previously described herein to afford the corresponding 3β-hydroxy substances. Illustrative of those processes is the reaction of 17β-acetoxy-17α-ethynylestr-5(10)-en-3-one with bromine in pyridine, thus affording 17β-acetoxy-17α-ethynylestra-4,9(10)-dien-3-one, which is reduced in tetrahydrofuran with lithium tri-(tertiary-butoxy) aluminum hydride to yield 17β-acetoxy - 17α - ethynylestra-4,9(10)-dien-3β-ol. The 17-mono-(lower alkanoates) thus produced are converted to the corresponding 3,17-bis-(lower alkanoates) by reaction with a lower alkanoic acid anhydride or halide in the manner described herein previously. 17α-ethynylestra-4,9(10)-diene-3β,17β-diol 17-acetate is thus contacted with acetic anhydride in pyridine to afford 17α-ethynylestra-4,9(10)-diene-3β,17β-diol 3,17-diacetate.

The compounds of the present invention exhibit valuable pharmacological properties. They are, for example, androgenic agents which are particularly advantageous in consequence of their lack of anabolic properties. They possess additional hormonal properties as is indicated by their estrogenic and anti-inflammatory activity. In addition, these compounds display anti-fertility properties.

The invention will appear more fully from the examples which follow. These examples are not to be construed as limiting the invention either in spirit or in scope however, as many modifications both in materials and methods will be apparent from this disclosure to those skilled in the art. In these examples, temperatures are given in degrees centigrade (° C.), and quantities of materials are expressed in parts by weight unless otherwise noted.

Example 1

To a solution of 2.5 parts of 17α-ethynyl-17β-hydroxyestra-4,9(10)-dien-3-one in 45 parts of tetrahydrofuran, under nitrogen, is added, at 0–5° with stirring, a solution of 7.5 parts of lithium tri(tertiary-butoxy) aluminum hydride in 41 parts of tetrahydrofuran. The reaction mixture is stirred at room temperature for about 2 hours, then is poured into a mixture consisting of 750 parts of ice and water containing approximately 50 parts of acetic acid. The resulting acidified mixture is immediately extracted with ethyl acetate, and the organic layer is separated, then washed successively with water, dilute aqueous sodium bicarbonate and water. Drying of that solution over anhydrous sodium sulfate containing decolorizing carbon followed by distillation of the solvent under reduced pressure affords the crude product as a solid residue. Purification of that material by recrystallization from acetone-hexane affords hydrated 17α-ethynylestra-4,9(10)-diene-3β,17β-diol, melting at about 79–80°. Heating of the latter material at about 140° affords the monohydrate as a glass. This compound exhibits an optical rotation of −38° in chloroform and is further characterized by an ultraviolet absorption maximum at about 250 millimicrons with a molecular extinction coefficient of about 15,000. It can be represented by the following structural formula

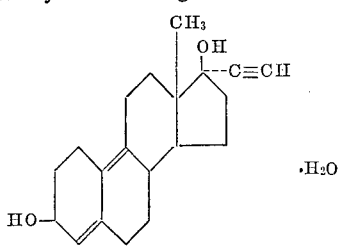

·H₂O

Example 2

A solution of 2 parts of 17α-ethynylestra-4,9(10)-diene-3β,17β-diol in 7 parts of acetic anhydride and 15 parts of pyridine is kept at room temperature for about 4 hours, then is poured carefully into a mixture of ice and water. The oily gum-like material which separates is extracted into ether, and the ether solution is washed with water, then dried over anhydrous sodium sulfate containing decolorizing carbon. Removal of the solvent by distillation under reduced pressure affords an oil which gradually solidifies upon standing. Recrystallization of that material from acetone-hexane affords 17α-ethynylestra-4,9(10)-diene-3β,17β-diol 3-acetate, melting at about 141–143°. This compound exhibits an ultraviolet absorption maximum at about 250 millimicrons with a molecular extinction coefficient of about 20,600. It displays also infrared absorption maxima, in chloroform, at about 2.76, 3.03, 3.41, 5.78, 6.10, 7.98 and 9.75 microns and is characterized further by the following structural formula

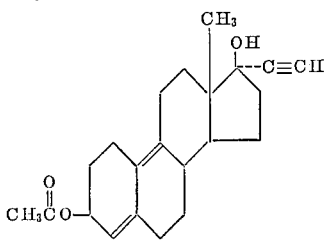

Example 3

To a solution of 2 parts of 17β-acetoxy-17α-ethynylestra-5(10)-en-3-one in 100 parts of pyridine is added, dropwise under nitrogen with stirring, 1.1 parts of bromine. The resulting reaction mixture is stirred at room temperature for about 2½ hours, then is poured carefully into a mixture of ice and water. Acidification of that aqueous mixture by the addition of hydrochloric acid followed by extraction with ether affords an organic solution which is washed successively with water, dilute hydrochloric acid and dilute aqueous sodium bicarbonate, then dried over anhydrous sodium sulfate containing decolorizing carbon. The solvent is distilled under reduced pressure to afford, as an oil, 17β-acetoxy-17α-ethynylestra-4,9(10)-dien-3-one, characterized by an ultraviolet absorption maximum at about 304 millimicrons with a molecular coefficient of about 16,500. Infrared absorption peaks are observed at about 3.01, 3.41, 5.78, 6.02, 6.18 and 7.98 microns.

To a solution of 1.5 parts of 17β-acetoxy-17α-ethynylestra-4,9,(10)-dien-3-one in 22.5 parts of tetrahydrofuran, under nitrogen at 0–5° with stirring, is added a solution of 4.5 parts of lithium tri-(tertiary-butoxy) aluminum hydride in 22.5 parts of tetrahydrofuran. The reaction mixture is stirred for about 2 hours, during which time it warms to room temperature. The reaction mixture is then poured into a mixture of ice and water containing excess acetic acid, then is immediately extracted with ether. The ether layer is separated, washed successively with water and 5% aqueous sodium bicarbonate, then dried over anhydrous sodium sulfate containing decolorizing carbon. Removal of the solvent by distillation under reduced pressure affords 17α-ethynylestra-4,9(10)-diene-3β,17β-diol 17-acetate as a glass. It exhibits an ultraviolet absorption maximum at about 250 millimicrons with a molecular extinction coefficient of about 8,000 and also infrared absorption peaks, in chloroform, at about 2.75, 3.03, 3.40, 5.72, 7.96 and 9.76 microns. This compound can be represented by the following structural formula

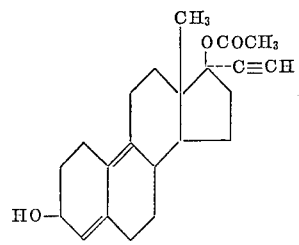

Example 4

A solution of 1.3 parts of 17α-ethynylestra-4,9(10)-diene-3β,17β-diol 17-acetate in 12 parts of pyridine containing 6 parts of acetic anhydride is kept at room temperature for about 16 hours, then is carefully poured into a mixture of ice and water. Extraction of the resulting aqueous mixture with ether affords an organic solution which is washed successively with 5% hydrochloric acid and 5% aqueous sodium bicarbonate, then dried over anhydrous sodium sulfate containing decolorizing carbon. Distillation of the solvent under reduced pressure affords 17α-ethynylestra-4,9(10)-diene-3β,17β-diol 3,17-diacetate as a glass, characterized by an ultraviolet absorption maximum at about 250 millimicrons with a molecular extinction coefficient of about 8300. Infrared absorption peaks are observed at about 3.02, 3.39, 5.73, 5.76, 6.02, 7.95 and 9.76 microns. This compound is characterized further by the following structural formula

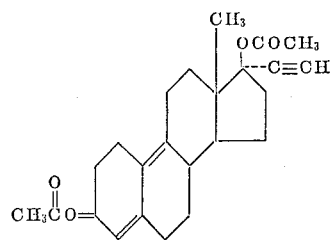

Example 5

When an equivalent quantity of 17β-hydroxy-17α-propynylestra-4,9(10)-dien-3-one is substituted in the procedure of Example 1, there is obtained 17α-propynylestra-4,9(10)-diene-3β,17β-diol.

Example 6

The reaction of equivalent quantities of 17α-propynylestra-4,9(10)-diene-3β,17β-diol and propionic anhydride according to the procedure described in Example 2 results in 17α-propynylestra-4,9(10)-diene-3β,17β-diol 3-propionate.

Example 7

When an equivalent quantity of 17β-propionoxy-17α-propynylestra-5(10)-en-3-one is substituted in the procedures of Example 3, there are obtained 17β-propionoxy-17α-propynylestra-4,9(10)-dien-3-one and 17β-propionoxy-17α-propynylestra-4,9(10)-dien-3βlol.

Example 8

By substituting equivalent quantities of 17β-propionoxy-17α-propynylestra-4,9(10)-diene-3β-ol and propionic anhydride in the procedure of Example 4, there is obtained 17α-propylylestra-4,9(10)-diene-3β,17β-diol 3,17-dipropionate.

What is claimed is:
1. A compound of the formula

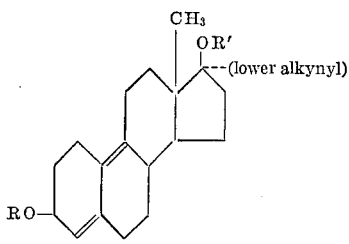

wherein R and R' are selected from the group consisting of hydrogen and a radical of the formula

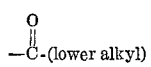

2. A compound of the formula

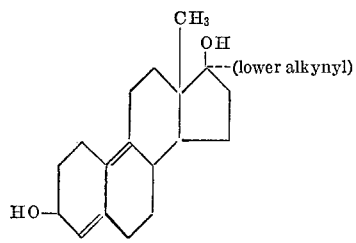

3. A compound of the formula

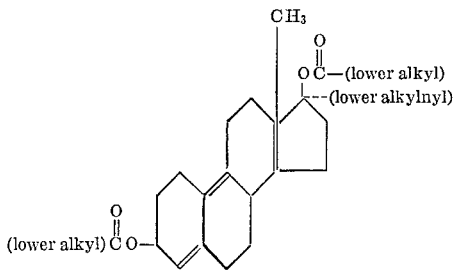

4. A compound of the formula

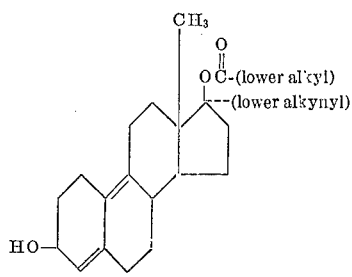

5. A compound of the formula

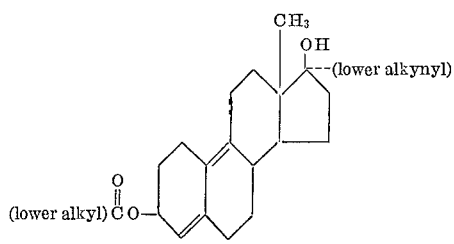

6. 17α-ethynylestra-4,9(10)-diene-3β,17β-diol.
7. 17α - ethynylestra-4,9(10)-diene-3β,17β-diol 3-acetate.
8. 17α-ethynylestra-4,9(10)-diene-3β,17β-diol 3,17-diacetate.
9. 17α-ethynylestra-4,9(10)-diene-3β,17β-diol 17-acetate.

References Cited
UNITED STATES PATENTS
3,086,027 4/1963 Perelman et al. ____ 260—397.3
3,250,793 5/1966 Fried _____ 260—397.5

OTHER REFERENCES
Fried, J., et al.: Journ. Amer. Chem. Soc., vol. 83, No. 22, 1961, pp. 4663–64.

LEWIS GOTTS, Primary Examiner.

ETHEL LOVE, Assistant Examiner.

U.S. Cl. X.R.
260—397.4, 999